(12) United States Patent
Sakamoto et al.

(10) Patent No.: US 8,707,738 B2
(45) Date of Patent: Apr. 29, 2014

(54) GLASS-MELTING FURNACE, PROCESS FOR PRODUCING MOLTEN GLASS, APPARATUS FOR PRODUCING GLASS PRODUCTS AND PROCESS FOR PRODUCING GLASS PRODUCTS

(75) Inventors: Osamu Sakamoto, Tokyo (JP); Chikao Tanaka, Tokyo (JP); Seiji Miyazaki, Tokyo (JP); Satoru Ohkawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/396,768

(22) Filed: Feb. 15, 2012

(65) Prior Publication Data
US 2012/0159992 A1 Jun. 28, 2012

Related U.S. Application Data (63) Continuation of application No. PCT/JP2010/063724, filed on Aug. 12, 2010.

(30) Foreign Application Priority Data

Aug. 20, 2009 (JP) ................................. 2009-191204

(51) Int. Cl.
*C03B 3/02* (2006.01)
*C05B 5/00* (2006.01)

(52) U.S. Cl.
USPC ............. 65/337; 65/136.2; 65/136.3; 65/335; 65/339

(58) Field of Classification Search
CPC .............. C03B 3/00; C03B 3/02; C03B 3/026
USPC ....................... 65/134.1–136.3, 335–345, 347
See application file for complete search history.

(56) References Cited

U.S. PATENT DOCUMENTS 2,544,091 A * 3/1951 Jordan ........................... 432/13
3,337,324 A 8/1967 Cable, Jr. et al.
(Continued)

FOREIGN PATENT DOCUMENTS

| CN | 1374261 A | 10/2002 |
|---|---|---|
| CN | 1516680 A | 7/2004 |

(Continued)

OTHER PUBLICATIONS

U.S. Appl. No. 13/335,054, filed Dec. 22, 2011, Sakamoto.
(Continued)

*Primary Examiner* — Matthew Daniels
*Assistant Examiner* — Lisa Herring
(74) *Attorney, Agent, or Firm* — Oblon, Spivak, McClelland, Maier & Neustadt, L.L.P.

(57) ABSTRACT

A glass-melting furnace, which suppresses the effect of exhaust gas on molten glass quality, a process for producing molten glass, and a process and apparatus for producing glass products. The glass-melting furnace containing: a raw glass material particle feed portion disposed downwardly at a furnace wall portion in an upper portion of the glass-melting furnace; a heating unit provided under the feed portion, which forms a gas phase portion for converting raw glass material particles into liquid glass particles; a flue inlet disposed on the upstream side of the gas phase portion in a flow direction of the molten glass liquid; a furnace-bottom portion, which accumulates the liquid glass particles that produce the molten glass liquid; and a discharge portion, which discharges the molten glass liquid.

12 Claims, 6 Drawing Sheets

(56) References Cited

U.S. PATENT DOCUMENTS

| | | | |
|---|---|---|---|
| 4,381,934 A * | 5/1983 | Kunkle et al. | 65/134.4 |
| 4,544,394 A | 10/1985 | Hnat | |
| 4,559,071 A * | 12/1985 | Kunkle et al. | 65/134.7 |
| 4,564,379 A * | 1/1986 | Kunkle et al. | 65/134.7 |
| 4,617,046 A | 10/1986 | Hals | |
| 4,632,687 A * | 12/1986 | Kunkle et al. | 65/27 |
| 4,634,461 A * | 1/1987 | Demarest et al. | 65/27 |
| 4,654,068 A * | 3/1987 | Kunkle et al. | 65/135.1 |
| 4,792,536 A * | 12/1988 | Pecoraro et al. | 501/70 |
| 4,877,449 A * | 10/1989 | Khinkis | 75/414 |
| 5,057,140 A * | 10/1991 | Nixon | 65/335 |
| 5,728,190 A * | 3/1998 | Pieper et al. | 65/134.4 |
| 6,001,148 A * | 12/1999 | Okamoto et al. | 75/10.15 |
| 6,237,369 B1 * | 5/2001 | LeBlanc et al. | 65/134.1 |
| 7,373,791 B1 * | 5/2008 | Leehr | 65/27 |
| 2009/0044568 A1 * | 2/2009 | Lewis | 65/134.4 |
| 2009/0064716 A1 * | 3/2009 | Sakamoto et al. | 65/33.1 |
| 2012/0137736 A1 * | 6/2012 | Sakamoto et al. | 65/66 |
| 2012/0137737 A1 * | 6/2012 | Sakamoto et al. | 65/66 |
| 2012/0151966 A1 * | 6/2012 | Sakamoto et al. | 65/66 |
| 2012/0159992 A1 * | 6/2012 | Sakamoto et al. | 65/66 |
| 2012/0159994 A1 * | 6/2012 | Sakamoto et al. | 65/136.3 |
| 2012/0167631 A1 * | 7/2012 | Sakamoto | 65/66 |
| 2012/0216571 A1 * | 8/2012 | Sakamoto et al. | 65/66 |

FOREIGN PATENT DOCUMENTS

| | | |
|---|---|---|
| CN | 201292304 | 8/2009 |
| CN | 201292304 Y * | 8/2009 |
| JP | 58-020735 | 2/1983 |
| JP | 2007-297239 | 11/2007 |
| JP | 2008-120609 | 5/2008 |

OTHER PUBLICATIONS

U.S. Appl. No. 13/342,565, filed Jan. 3, 2012, Sakamoto, et al.
U.S. Appl. No. 13/346,192, filed Jan. 9, 2012, Sakamoto, et al.
U.S. Appl. No. 13/357,117, filed Jan. 24, 2012, Sakamoto, et al.
U.S. Appl. No. 13/370,820, filed Feb. 10, 2012, Sakamoto, et al.
U.S. Appl. No. 13/463,193, filed May 3, 2012, Sakamoto, et al.
International Search Report issued Oct. 5, 2010 in PCT/JP2010/063724 filed Aug. 12, 2010.
Supplementary European Search Report issued Feb. 6, 2013, 2013 in EP10809921, filed Aug. 12, 2010.
Chinese Office Action dated Nov. 25, 2013 issued in corresponding Chinese patent application No. 201080037301.1.

* cited by examiner

GLASS-MELTING FURNACE, PROCESS FOR PRODUCING MOLTEN GLASS, APPARATUS FOR PRODUCING GLASS PRODUCTS AND PROCESS FOR PRODUCING GLASS PRODUCTS

TECHNICAL FIELD

The present invention relates to a glass-melting furnace for producing molten glass by producing liquid glass particles from glass raw material particles in a high temperature gas phase atmosphere; a process for producing molten glass by using the glass-melting furnace; an apparatus for producing glass products employing the glass-melting furnace; and a process for producing glass products using the above process for producing molten glass.

BACKGROUND ART

Patent Documents 1 and 2 each discloses as a glass-melting furnace for melting glass raw material particles in a high temperature gas phase atmosphere and accumulating them to produce molten glass, a glass-melting furnace having a glass raw material particle feed portion and a heating means for forming a high temperature gas phase atmosphere for melting the glass raw material particles in the ceiling portion of the glass-melting furnace.

This glass-melting furnace is an apparatus for melting glass raw material particles, that are fed from the glass raw material feed portion into the inside of the furnace, in a high temperature gas phase atmosphere heated by a heating means, to produce liquid glass particles, accumulating the liquid glass particles in a bottom portion of the glass-melting furnace to form molten glass liquid, temporarily storing the molten glass liquid in the bottom portion of the glass-melting furnace, and discharging the molten glass liquid. Further, such a production process of molten glass is known as in-flight glass melting method. In this in-flight glass melting method, as compared with a conventional melting method using a Siemens type furnace, it is possible to reduce consumption energy in glass-melting step to be about one thirds to produce molten glass in a short time, and accordingly, it is possible to downsize a melting furnace, omit a regenerator, improve quality, reduce $CO_2$ and to shorten a time for changing glass type. Such an in-flight glass melting method of glass is attentioned as a technique for saving energy.

By the way, as the glass raw material particles to be fed from the glass-raw material particle feed portion, one granulated into a particle size of at most 1 mm, is commonly employed. Each particle of the glass raw material particles fed into the glass-melting furnace is melted to be a liquid glass particle while it falls (flies) in a high temperature gas phase atmosphere, and such liquid glass particles fall downwardly and are accumulated in the bottom portion of the glass-melting furnace to form a molten glass liquid. The liquid glass particles produced from the glass raw material particles may be expressed as drops of molten glass. In order to produce the liquid glass particles from the glass raw material particles in the high temperature gas phase atmosphere in a short time, the particle size of the glass raw material particles has to be small as described above. Further, usually, each liquid glass particle produced from each glass raw material particle needs to be a particle having substantially the same glass composition.

Almost all of decomposed gas components, that are generated when the glass raw material particles become liquid glass particles, are discharged to the outside of the molten glass particles without being contained in the molten glass particles since both of the glass raw material particles and the liquid glass particles are small particles. Accordingly, there is little risk that bubbles are formed in the molten glass liquid produced by accumulating the liquid glass particles.

Meanwhile, the glass raw material particles are particles having substantially uniform components, and glass compositions of liquid glass particles produced from the glass raw material particles are uniform from one another. Since the difference of glass composition among the liquid glass particles is small, there is little risk that glass composition is different between portions of molten glass liquid produced by accumulation of a large number of the liquid glass particles. Accordingly, a homogenizing means for homogenizing the glass composition in molten glass liquid, that has been required in conventional glass-melting furnaces, is scarcely required in in-flight glass melting method. Even if a small amount of liquid glass particles are different from the rest of liquid glass particles in the glass composition, since the molten glass particles are small in the particle size, an heterogeneous region of molten glass liquid, that is produced from the small amount of molten glass particles having different glass composition, is small and such a region is easily homogenized and disappears in a short time. Thus, with the in-flight glass melting method, it is possible to reduce heat energy required to homogenize molten glass liquid and to shorten a time required for homogenization.

The glass-melting furnace of Patent Document 1 has a plurality of arc electrodes and/or oxygen combustion nozzles as heating means for forming a high-temperature gas phase atmosphere, and a high-temperature gas phase atmosphere of at least 1,600° C. is formed in the furnace by a thermal plasma arc formed by the plurality of arc electrodes and/or oxygen combustion flames formed by the oxygen combustion nozzles. By feeding glass raw material particles into the high-temperature gas phase atmosphere, the glass raw material particles are changed to liquid glass particles in the high temperature gas phase atmosphere. Further, as glass raw material particles employed in Patent Document 1, ones having a particle size of at most 0.5 mm (weight-averaged) are employed for the reason that they can be changed into liquid glass particles in a short time and dissipation of generated gases is easy. Further, from the viewpoints of cost increase for reduction of the particle size of the glass raw material particles and reduction of the glass composition variation among generated liquid glass particles, ones having a particle size of at least 0.01 mm (weight-averaged) are employed.

Meanwhile, the glass-melting furnace of Patent Document 2 has an oxygen burner attached downwardly from a ceiling wall of the glass-melting furnace as a heating means. To this oxygen burner, a gas supply line and a raw material supply line are connected so that a combustion-supporting gas having an oxygen concentration of at least 90 vol % and a glass raw material are supplied. Accordingly, with this glass-melting furnace, it is possible to form a downward flame by operation of the oxygen burner and supply glass raw material particles downwardly into the flame from the oxygen burner to produce liquid glass particles in the flame, and to accumulate the produced liquid glass particles in a furnace bottom right under the flame to form a molten glass liquid. This oxygen combustion burner is provided through an upstream side wall face of a ceiling wall of the glass-melting furnace. Further, in the glass-melting furnace of Patent Document 2, a flue (exhaust port) is provided for discharging an exhaust gas produced at the time of melting glass raw material particles, to the outside the furnace. This flue is disposed on a downstream side wall face of the ceiling wall of the glass-melting furnace, and is connected to a suction fan, whereby when the suction fan is operated, the exhaust gas in the glass-melting furnace is suctioned and discharged.

As described in Patent Document 2, the oxygen combustion burner is disposed on the upstream side in a flow direction of the molten glass liquid in the glass-melting furnace so that the molten glass liquid, that has been melted by the oxygen combustion burner, is homogenized on the downstream side of the glass-melting furnace. Further, the flue is disposed on the downstream side in the flow direction of molten glass in order to efficiently use a high-temperature exhaust gas discharged from the oxygen combustion burner, for heating of the molten glass.

The molten glass of about 1,600° C. produced by the glass-melting furnace of Patent Document 1 or 2 is supplied from the glass-melting furnace to a temperature conditioning tank or a refining tank, and is cooled to a temperature at which the glass is formable (about 1,000° C. in a case of soda lime glass). Then, this molten glass is supplied to a forming means of glass products such as a float bath, a fusion forming machine, a roll out forming machine, a blow forming machine or a press molding machine, and formed into glass products having various shapes. Then, the formed glass products are cooled to approximately a room temperature by an annealing means, and thereafter, subjected to a cutting step by a cutting means and/or other back-end steps as the case requires, to be fabricated into desired glass products.

PRIOR ART DOCUMENTS

Patent Documents

Patent Document 1: JP-A-2007-297239
Patent Document 2: JP-A-2008-120609

DISCLOSURE OF INVENTION

Technical Problem

By the way, in the in-flight glass melting facilities disclosed in Patent Documents 1 and 2, a part of glass raw material particles and melted glass particles fly in a mist form, and float up in an exhaust gas flow without reaching a molten glass liquid on a furnace bottom, and they are sucked into a flue and discharged to the outside. On this occasion, not all of the particles floating in the furnace are sucked into the flue and removed, but a part of the particles adhere to a furnace wall. The particles adhered to the furnace wall corrode refractories, and a reacted product of a reaction between the particles and the refractories peel from the furnace wall and drop on a molten glass liquid surface, which causes a problem of deterioration of the quality of molten glass. Particularly, in the facility of Patent Document 2, since the distance from a high-temperature gas phase portion produced by an oxygen combustion burner to a flue, is long, there is a risk that the above problem occurs often.

The above liquid glass particles changed from the glass raw material particles and floating off the path toward accumulation in the furnace bottom, are considered to be consisting of unmelted glass raw material particles, melted liquid glass particles, solidified particles thereof, glass raw material particles becoming liquid glass particles (for example, glass raw material particles a part of which (such as a carbonate) is decomposed, particles a surface of which is melted or solidified particles thereof, etc.), and pulverized particles of these particles, etc. Further, in a case of producing a molten glass by employing particles of glass cullet in combination with glass raw material particles, a part of glass cullet particles fed into the melting furnace may become floating particles without reaching a molten glass liquid surface. For example, fine glass cullet particles, melted glass cullet particles, melted and re-solidified glass cullet particles and fragments of these particles are considered to become floating particles. Further, it is considered that splashes of liquid glass formed by collision of e.g. glass cullet particles with the surface of molten glass liquid, and solidified products thereof may also become floating particles.

Particles derived from these glass raw material particles or glass cullet particles, which do not reach a molten glass surface on the furnace bottom, are hereinafter referred to as floating particles.

Further, in the facility of Patent Document 2, an exhaust gas flows from the upstream side to the downstream side above a molten glass, and the temperature of the exhaust gas becomes gradually lower as the gas moves to the downstream side. By this phenomenon of temperature drop, there has been a problem that volatile components contained in the exhaust gas are condensed and solidified to be floating particles, and fall on the molten glass surface on the downstream side to contaminate a homogenous molten glass. Further, in the facility of Patent Document 2, besides the volatile components, floating particles in the exhaust gas fall on the surface of molten glass. Even if the floating particles are liquid glass particles or solidified liquid glass particles, since they are different from molten glass at falling position of these particles in the temperature history or the glass composition, such fall causes inhomogeneity of the molten glass. For example, in a case of a glass containing volatile components (such as boron oxide), since the degree of volatilization of volatile components from floating particles is different from the degree of volatilization of volatile components from the molten glass liquid, even if both of them are glasses made from the same glass raw material particles, the glass composition of the floating particles is different from the glass composition of the molten glass liquid in the downstream region of the flow of molten glass liquid in some cases. Accordingly, when floating particles having different glass composition from the molten glass liquid is mixed into the molten glass liquid in the downstream region of the flow of molten glass, the homogeneity of the molten glass may be deteriorated.

The present invention has been made considering these problems, and it is an object of the present invention to provide a glass-melting furnace which can suppress quality deterioration of molten glass due to exhaust gas, a process for producing molten glass, an apparatus for producing glass products and a process for producing glass products.

Solution to Problem

In order to achieve the above objects, the present invention provides a glass-melting furnace for changing glass raw material particles into liquid glass particles in a gas phase atmosphere in the glass-melting furnace, accumulating the liquid glass particles in a bottom portion of the glass-melting furnace to obtain a molten glass liquid and discharging the molten glass liquid; the glass-melting furnace comprising a glass raw material particle feed portion disposed downwardly at a furnace wall portion in an upper portion of the glass-melting furnace; a heating means provided under the glass-raw material feed portion in the glass-melting furnace for forming a gas phase portion for changing glass raw material particles into liquid glass particles; an inlet of flue disposed on the upstream side of the gas phase portion in a flow direction of the molten glass liquid and at a height within a range below a half of the height of a space above the molten glass liquid surface; a furnace-bottom portion for accumulating the liquid glass particles to produce the molten glass liquid; and a discharge portion for discharging the molten glass liquid. Here, the "gas phase portion" in the passage "on the upstream side of the gas phase portion in the flow direction of molten glass liquid" is a high-temperature atmosphere region formed by a heating means, which is an atmosphere region defined by a border surface with the other atmosphere in the glass-melting furnace.

In the present invention, particles (floating particles) derived from e.g. glass raw material particles dissipated from a high-temperature gas phase portion and floating without reaching a molten glass liquid surface in a furnace bottom portion, do not move toward a furnace wall of the glass-melting furnace but they are sucked efficiently into a flue to be exhausted into the outside. Accordingly, the amount of floating particles adhered to the furnace wall drastically decreases and the amount of floating particles moving toward the downstream side drastically decreases, and accordingly, it is possible to prevent damage of furnace wall and deterioration of the quality of molten glass.

Here, the molten glass surface means a height of a molten glass liquid surface assumed at a time of designing the glass-melting furnace. For example, it is a position 50 to 100 mm below the upper end portion of a refractory that is assumed to contact with molten glass liquid at a time of design. A molten glass liquid surface in a case of ordinary glass-melting furnace is from 1 to 1.5 m, but a molten glass liquid surface in a case of in-flight glass melting may be at a position lower than the above height. Further, at a time of changing glass raw material particles into liquid glass particles, a glass raw material particle feed portion and a heating means for forming a high-temperature gas phase portion, are employed. The liquid glass particles fall and reach the molten glass liquid surface, they are changed into a molten glass, temporarily stored, and supplied to the downstream side. The furnace wall portion in the upper portion of the glass-melting furnace in this specification means a ceiling portion of a glass-melting furnace and a range of a side wall within 1 mm from an inner wall of the ceiling portion.

When these floating particles have a good quality, it is possible to produce products from a molten glass liquid obtained by capturing the floating particles.

In the glass-melting furnace of the present invention, it is preferred that the inlet of the flue is disposed so that the upper edge portion of the inlet is located at a position ¼ to ⅓ of the distance between the molten glass liquid surface and a ceiling inner wall surface of the glass-melting furnace, above the molten glass surface.

In this preferred embodiment, an exhaust gas accompanied by formation of a gas phase portion blown from a heating means toward a molten glass liquid surface, is not blown up in the furnace, but suctioned more efficiently into a flue through an inlet of the flue disposed in a lower portion of the glass-melting furnace, to be exhausted. Accordingly, it is possible to more efficiently prevent dispersion of floating particles contained in the exhaust gas in the furnace.

In the glass-melting furnace of the present invention, it is preferred that the heating means is disposed so as to form the gas phase portion in an oblique downward direction toward the flow direction of the molten glass liquid.

In this preferred embodiment, an exhaust gas (containing a gas for raw material transportation) accompanied to formation of the gas phase portion by the heating means, is blown in an obliquely downward forward direction when it is blown from the heating means. Thereafter, the exhaust gas flows backwardly toward the flue. Accordingly, floating particles contained in the exhaust gas tend to be captured by a molten glass liquid since they tend to contact with the molten glass liquid surface as compared with a case of disposing the heating means in the vertical direction or the horizontal direction. Accordingly, since the amount of floating particles in the exhaust gas decreases, it becomes possible to efficiently vitrify the glass raw material particles.

The glass-melting furnace of the present invention may further comprise a drain-out portion formed under the flue, and a dam for separating a molten glass liquid in the drain-out portion from the above molten glass liquid.

Floating particles in the exhaust gas passing through the flue adhere to the flue in the same manner as the furnace wall, whereby the refractories in the flue is corroded and a reacted product at the time of corrosion falls. Accordingly, in the present invention, it is preferred to form a drain-out portion under the flue, and to provide a dam for separating a molten glass present in the drain-out portion from a molten glass occupying the most of the glass-melting furnace. In this preferred embodiment, the reacted product does not fall into the molten glass becoming a product, but falls on the molten glass liquid surface present in the drain-out portion, and discharged to the outside. Accordingly, the fall of the reacted product does not affect the quality of the molten glass occupying the most of the glass-melting furnace. Namely, a non-product molten glass is stored in the drain-out portion, and the reacted product is captured by this non-product molten glass.

In the glass-melting furnace of the present invention, the construction may be such that the flue is disposed vertically, and a glass cullet piece feed portion for feeding glass cullet pieces is provided in an upper portion of the flue.

In this embodiment, when glass cullet pieces are fed from the glass cullet piece feed portion, the glass cullet pieces are heated by a high-temperature exhaust gas flowing in the flue, and fall onto the molten glass liquid below present under the flue. Accordingly, since the glass cullet pieces are preliminary heated by the exhaust gas before being captured by the molten glass liquid, it is possible to more efficiently melt the glass cullet pieces as compared with an embodiment of directly feeding the glass cullet pieces into the molten glass liquid. Further, the floating particles in the exhaust gas are captured by the molten glass liquid present under the flue, in a state that the floating particles are adhered to the falling glass cullet pieces. Accordingly, the amount of floating particles adhering to the flue decreases, and it is possible to prevent deterioration of the quality of molten glass due to adhesion of the floating particles to the flue.

In the glass-melting furnace of the present invention, it is preferred that a heating means is provided for heating a molten glass liquid under the glass cullet piece feed portion.

In the glass-melting furnace of the present invention, it is preferred that the heating means for forming the gas phase portion is at least one of an oxygen combustion burner for producing oxygen combustion flame, and a multi-phase arc plasma generation apparatus constituted by at least one pair of electrodes for producing thermal plasma.

In the present invention, an oxygen combustion flame by the oxygen combustion burner can form a high-temperature atmosphere of about 2,000° C., and a thermal plasma can form a high-temperature atmosphere of from 5,000 to 20,000° C. Accordingly, it is possible to melt falling glass raw material particles in a short time. Here, the oxygen combustion burner and the multi-phase arc plasma generation apparatus may be each disposed alone or they may be used in combination. Further, as the oxygen combustion burner to be used as the heating means, a burner in a form integrated with the glass raw material particle feed portion, may be employed.

In order to achieve the above objects, the present invention provides a process for producing molten glass employing any one of the above glass-melting furnaces for producing a molten glass.

The process for producing molten glass of the present invention is a process for producing molten glass, which is a process of changing glass raw material particles into liquid glass particles in a gas phase atmosphere in a glass-melting furnace, accumulating the liquid glass particles in a bottom portion of the glass-melting furnace to obtain a molten glass liquid; the process comprising: supplying the glass raw material particles downwardly from a furnace wall portion in an upper portion of the glass-melting furnace, making the glass raw material particles pass through a gas phase portion formed by a heating means to change them into liquid glass particles; sucking an exhaust gas produced by the heating means for forming the gas phase portion, from an inlet of a flue disposed on the upstream side of the gas phase portion in the flow direction of the molten glass liquid and at a height within a range below a half of the height of a space above the molten glass liquid surface; and accumulating the liquid glass particles in a bottom portion of the glass-melting furnace to obtain a molten glass liquid.

In the process for producing molten glass of the present invention, it is preferred that capturing floating particles, that are derived from glass raw material particles contained in the exhaust gas suctioned from the inlet of the flue and passing through the flue and that do not reach the molten glass surface in the furnace bottom portion, by a molten glass liquid right under the flue.

In the process for producing molten glass of the present invention, it is preferred that the inlet of the flue is disposed so that the upper edge portion of the inlet is located at a position ¼ to ⅓ of the distance between the molten glass liquid surface and a ceiling inner wall surface of the glass-melting furnace, above the molten glass liquid surface.

In order to achieve the above objects, the present invention provides an apparatus for producing glass products, comprising any one of the above glass-melting furnaces, a forming means for forming a molten glass provided on the downstream side of the glass-melting furnace, and an annealing means for annealing the formed glass.

In order to achieve the above objects, the present invention provides a process for producing glass products, comprising a step of producing a molten glass by any one of the above processes for producing molten glass, a step of forming the molten glass, and a step of annealing the formed glass.

Advantageous Effects of Invention

As described above, by the glass-melting furnace and the process for producing molten glass of the present invention, it is possible to suppress damage of a furnace wall due to exhaust gas and deterioration of the quality of molten glass, thereby to produce a molten glass having a good quality for a long time.

Further, by the apparatus for producing glass products and the process for producing glass products of the present invention, since it is possible to produce a molten glass having a good quality by the glass-melting furnace and the production process of the present invention, it is possible to produce glass products having a good quality for a long time.

DESCRIPTION OF EMBODIMENTS

Now, preferred embodiments of the glass-melting furnace, the process for producing molten glass, the apparatus for producing glass products and the process for producing glass products of the present invention will be described with reference to attached Drawings.

In the illustrated glass-melting furnace, a heating means for forming a gas phase portion comprises an oxygen combustion burner. The gas phase portion is constituted by a flame of oxygen combustion burner and a high temperature portion in the vicinity of the flame.

A glass raw material particle feed portion for supplying glass raw material particles to the gas phase portion is integrated with the oxygen combustion burner, and in the vicinity of the outlet of the oxygen combustion burner, a tube for supplying a combustion gas, a tube for supplying oxygen and a tube for supplying glass raw material particles are coaxially constructed.

This combination of the glass raw material particle feed portion and the oxygen combustion burner is referred to as a glass raw material particle heating unit.

Figure 1:
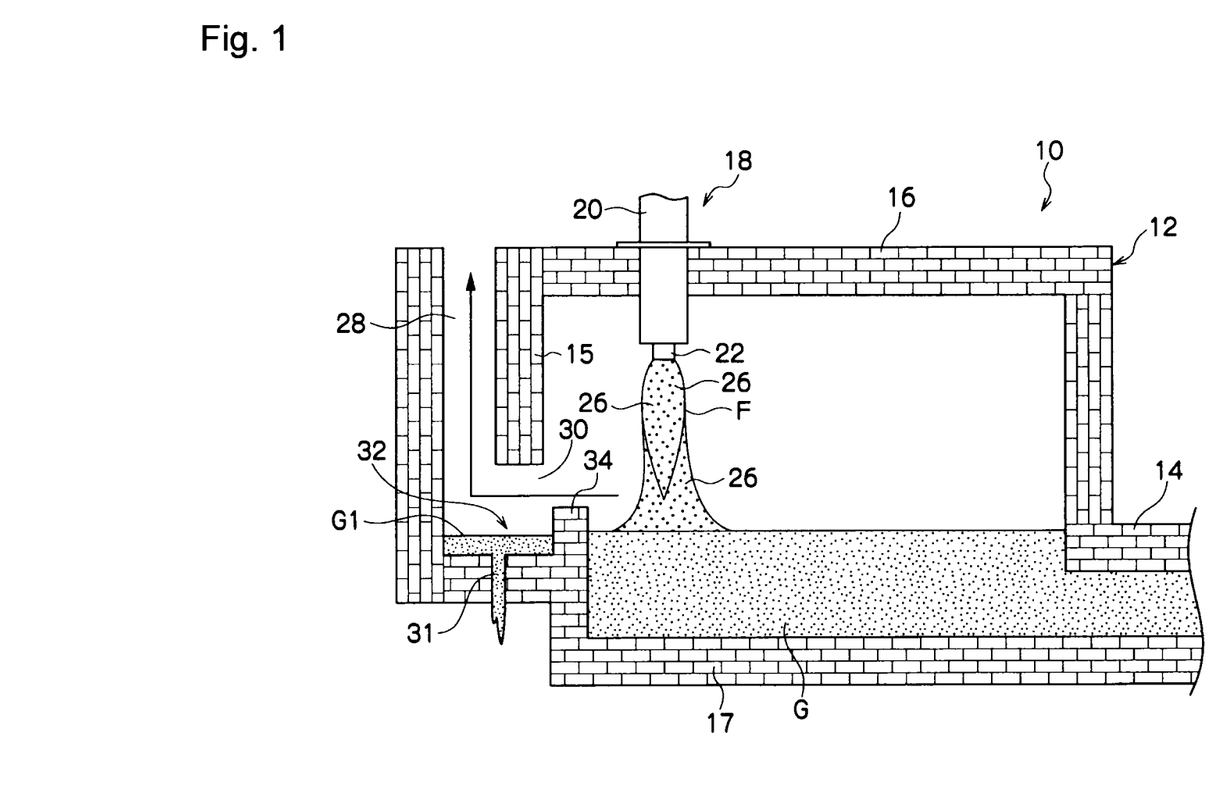
FIG. 1 is a vertical cross-sectional view of a glass-melting furnace of a first embodiment constituting a process for producing glass products of the present invention.

FIG. 1 is a vertical cross-sectional view of a glass-melting furnace 10 of a first embodiment constituting an apparatus for producing glass products of the present invention.

The glass-melting furnace 10 have a melting tank 12 and an outlet 14 for discharging molten glass G, and the melting tank 12 and the outlet 14 are constituted by known refractory bricks. Further, on a ceiling wall 16 being a furnace wall portion in the upper portion of the melting tank 12, one glass raw material particle heating unit 18 is disposed, whereby a high temperature gas phase portion for changing the glass raw material particles into liquid glass particles is formed in the in-furnace gas phase atmosphere. In a furnace bottom portion 17 and the outlet 14 in the bottom portion of the melting tank 12, a molten glass liquid G is stored, and the furnace is constructed so that the molten glass liquid G produced in the melting tank 12 flows through the outlet 14 to the downstream side. The furnace bottom portion 17 is constituted by known refractory bricks. Here, the arrangement direction of the glass raw material particle heating unit 18 is not limited to vertically downward direction, but it may be an oblique direction so long as it is a downward direction. Further, the shape of the ceiling wall 16 of the melting tank 12 is not limited to a flat shape, but it may be an arch shape, a dome shape, etc.

Further, a case where the glass raw material particle heating unit 18 is not disposed from the ceiling wall 16 but on a side wall in the upper portion of the glass-melting furnace 12, is also within the scope of the present invention. In the case where the glass raw material particle heating unit 18 is provided on the side wall, the glass raw material particle heating unit 18 is provided on the side wall at a height within 1 m in the vertical direction from the inner wall of the ceiling wall 16 of the glass-melting furnace 12. This is because if the glass raw material particle heating unit 18 is provided at a position exceeding 1 m in the vertical direction from the inner wall of the ceiling wall 16 of the glass-melting furnace 12, the vertical distance from the molten glass liquid surface becomes so small that the angle of the glass raw material particle heating unit 18 to the horizontal direction becomes small, and accordingly, the glass raw material particles are blown against an opposed wall surface, whereby corrosion of the wall surface and contamination of glass caused by the corrosion occur. The glass raw material particle heating unit 18 is preferably provided at a height within 80 cm, more preferably at a height within 60 cm in the vertical direction from the inner wall of the ceiling wall 16 of the glass-melting furnace 12.

In each of the melting tank 12 and the outlet 14, a molten glass liquid G is stored, and the furnace is configured so that the molten glass liquid G produced in the melting tank 12 flows to the downstream side through the outlet 14.

As the glass raw material particle heating unit 18, an oxygen combustion burner 20, that is an integrated device of the glass raw material particle feed portion and a heating means, is employed.

The oxygen combustion burner 20 is an oxygen combustion burner wherein supply nozzles for a raw material, a fuel and oxygen are appropriately arranged, that is known as a burner for heating inorganic powder. A nozzle 22 in the leading edge portion of the oxygen combustion burner 20 has a construction wherein a fuel supply nozzle, a combustion support gas supply nozzle for primary combustion, a glass raw material particle supply nozzle and a combustion support gas supply nozzle for secondary combustion are arranged in a concentric circular form in this order as a whole. From the nozzle 22, a flame F is blown downwardly and glass raw material particles 26 are supplied from the glass raw material particle supply nozzle by gas conveyance or mechanical conveyance into the flame F (that is, a gas phase portion). By this method, it is possible to securely change the glass raw material particles 26 into liquid glass particles in a short time. Here, although not shown, a glass raw material supply line for supplying glass raw material particles to the glass raw material particle supply nozzle, a fuel supply line for supplying a fuel to the fuel supply nozzle, and a gas supply line for supplying a combustion support gas to a combustion support gas supply nozzle for primary combustion and a combustion support gas supply nozzle for secondary combustion, are connected to the oxygen combustion burner 20.

The average particle size (weight-averaged) of the glass raw material particles is preferably from 30 to 1,000 μm. More preferably, glass raw material particles having an average particle size (weight-averaged) within a range of from 50 to 500 μm are employed, and glass raw material particles within a range of from 70 to 300 μm are still more preferred. The average particle size (weight-averaged) of the liquid glass particles (a) that are produced by melting the glass raw material particles, is about 80% of the average particle size of glass raw material particles in most cases.

Thus, when the oxygen combustion burner 20, that is an integrated device of the glass raw material particle feed portion and the heating means, is employed, since the oxygen combustion burner 20 functions also as the glass raw material particle feed portion, it is not necessary to provide a glass raw material particle feed portion separately. However, a glass raw material particle feed portion for feeding glass raw material particles into the flame F of the oxygen combustion burner 20, may be separately provided so as to be adjacent to the oxygen combustion burner 20.

Here, the heating means for forming a gas phase portion is not limited to the oxygen combustion burner 20, but a multiphase arc plasma generation apparatus constituted by at least one pair of electrodes for generating thermal plasma, may be provided on a ceiling wall 16 of a melting tank 12, or both of the oxygen combustion burner 20 and the multiphase arc plasma generation apparatus may be provided in the melting tank 12. Further, the temperatures of the flame F of the oxygen combustion burner 20 and the thermal plasma are preferably set to be at least 1,600° C. that is higher than the melting temperature of silica sand in order to quickly decompose decomposable components (such as carbonates) contained in the glass raw material particles, quickly dissipate a gas produced by the decomposition (hereinafter referred to as vaporize and dissipate) and to promote vitrification reaction together with other glass raw materials. By this method, the glass raw material particles fed in the furnace are quickly vaporized and dissipated by the flame F and/or the thermal plasma, and by the heat of high temperature, they become liquid glass particles and fall on the bottom portion of the melting tank 12 to become a molten glass liquid. Then, the vitrified state of the molten glass liquid G formed by accumulation of the liquid glass particles is maintained because it is continuously heated by the flame F and/or the thermal plasma. Here, the central temperature of the flame F is about 2,000° C. in the case of oxygen combustion, and it is from 5,000 to 20,000° C. in the case of thermal plasma.

In the figure, particles 26 shown in the flame F or under the flame F indicate glass raw material particles changing to the liquid glass particles and liquid glass particles that have been changed from the glass raw material particles. Since the glass raw material particles are considered to change to liquid glass particles in the flame F, hereinafter, the particles are also referred to as liquid glass particles 26.

In the melting tank 12 of this embodiment, the glass raw material particle heating unit 18 is disposed on the upstream side in the flow direction of molten glass liquid G. Further, a flue 28 is disposed on the upstream side of a gas phase portion formed by the glass raw material particle heating unit 18, in the flow direction of molten glass liquid. The flue 28 is disposed in the vertical direction, and communicates with an atmosphere in the melting tank 12 via an inlet 30 opening through an upstream side wall face 15 of the melting tank 12 and in the vicinity of a surface of the molten glass liquid G. Further, to this flue 28, a suction fan is connected via a cooling apparatus and a dust-collecting apparatus, not shown, and by operating the suction fan, a high-temperature exhaust gas in the melting tank 12 is suctioned through the inlet 30 into the flue 28. The exhaust gas suctioned into the flue 28 is cooled to have a predetermined temperature by the cooling apparatus, dust in the exhaust gas is removed by the dust-collecting apparatus, and the exhaust gas is exhausted to the outside by the suction fan.

Meanwhile, in the melting tank 12, a drain-out portion 32 having a discharge hole 31 is formed under the flue 28, a dam 34 is formed from a furnace bottom 17 for separating non-product molten glass liquid G1 from main glass liquid G in the melting tank 12. The dam 34 is formed at a position more inside of the melting tank 12 than the upstream side wall face of the melting tank 12. Accordingly, all of reacted products falling from a wall face of the flue 28 fall into the drain-out portion 32 and discharged to the outside through a discharge hole 31, and accordingly, the reacted products do not fall into product molten glass liquid G.

Next, functions of the glass-melting furnace having the above construction will be described.

In the glass-melting furnace, glass raw material particles are fed from the oxygen combustion burner 20, and the falling glass raw material particles are heated to be melted by a flame F of the oxygen combustion burner 20, to form liquid glass particles 26, 26 .... The liquid glass particles 26, 26 ... fall downwardly on a surface of molten glass liquid G.

In such an in-flight glass melting, in the melting tank 12 of this embodiment, the glass raw material particle heating unit 18 is disposed on the upstream side in the flow direction of the molten glass liquid G, and the flue 28 is disposed further on the upstream side of a high-temperature gas phase portion formed by the glass raw material particle heating unit 18 in the flow direction of molten glass liquid. Accordingly, glass fine particles dissipated from the flame F of the oxygen combustion burner 20 and floating, that is the above floating particles, are sufficiently suctioned into the flue 28 through the inlet 30 together with the exhaust gas without moving toward the furnace wall of the melting tank 12, and exhausted to the outside and removed.

Particles 27 shown in the figure indicate particles deviated from a main stream of liquid glass particles 26, 26 ... moving downwardly. Since these particles 27 deviate from a halfway of the flame F blowing downwardly, and heating of these particles may become insufficient and they may not become liquid glass particles. Some of these particles 27 finally fall onto the molten glass liquid surface, but some of them become floating particles without falling onto the molten glass liquid surface. In the present invention, these particles are suctioned into the flue 28 through the inlet 30, to reduce the amount of floating particles. However, not all floating particles derive from such particles 27. Further, not all of the particles 27 become floating particles, and a part of the particles 27 fall on the molten glass liquid surface in the vicinity of a position right under the flame F, and integrated with the molten glass liquid.

Accordingly, in the melting tank 12, the amount of floating particles adhering to the furnace wall drastically decreases, and the amount of floating particles floating toward the downstream side drastically decreases, whereby damage of the furnace wall and deterioration of the quality of molten glass can be prevented. Accordingly, with the glass-melting furnace of this embodiment, it is possible to produce a molten glass having a good quality.

Further, in this melting tank 12, since floating particles in the exhaust gas passing through the flue 28 adhere to the flue 28 in the same manner as the furnace wall, refractories of the flue 28 are corroded, and reacted products at the time of the corrosion fall. For this reason, in the melting tank 12, a drain-out portion 32 is formed under the flue 28, and a non-product molten glass liquid G1 in this drain-out portion 32 is separated from a molten glass liquid G by a dam 34. Accordingly, reacted products fallen from the flue 28 fall into the non-product molten glass liquid G1 in the drain-out portion 32 and discharged to the outside of the furnace through a discharge hole 31, whereby the reacted products are discharged to the outside from the drain-out portion 32 without being mixed into the product molten glass liquid G. Accordingly, the reacted products fallen from the flue 28 do not affect the quality of the product molten glass.

Further, in this melting tank 12, an inlet 30 of the flue 28 is disposed in the vicinity of a surface of the molten glass liquid G. Accordingly, an exhaust gas blown from the oxygen combustion burner 20 toward the surface of the molten glass liquid G is not blown up in the furnace, but is efficiently sucked through the inlet 30 into the flue 28 and exhausted.

Accordingly, it is possible to securely prevent floating particles contained in the exhaust gas from dispersing in the furnace. Here, the inlet 30 of the flue 28 is disposed at a height within a range below a half of the height of a space above the surface of molten glass liquid G. In other words, the inlet 30 of the flue 28 is disposed so that the upper edge portion of the inlet 30 is located at a position less than a half of the distance between the surface of the molten glass liquid G and an inner wall of a ceiling wall 16 of the furnace wall, above the surface of the molten glass liquid G. It is preferred that the upper edge portion of the inlet 30 is located at a position ¼ to ⅓ of the distance between the surface of the molten glass liquid G and the inner wall of the ceiling wall 16 of the furnace wall, above the surface of the molten glass liquid G, from the viewpoint of exhaust efficiency of the exhaust gas. If the inlet 30 of the flue 28 is disposed at a position ½ of the height of the space above the surface of the molten glass liquid G, or above the position, there is a risk that the floating particles are not suctioned smoothly into the inlet 30 but dispersed in the melting tank 12. In terms of the size of the inlet 30 of the flue 28, since the size in the height direction is restricted as described above, the size in the width direction is determined so as to increase the exhaust efficiency considering easiness of flow of the exhaust gas in the flue 28, the type of exhaust gas, the temperature of the exhaust gas, the amount of exhaust gas, that is the size of the glass-melting furnace, etc.

Further, since it is sufficient that the inlet 30 of the flue 28 is located at a position on the upstream side of a high-temperature gas phase portion for heating glass raw material particles and at a height within a range below ½ of the height of a space above the surface of the molten glass liquid G, the position of the inlet 30 of the flue 28 may be located not only on a back surface on the upstream side of the melting tank 12, but it may be on a side wall surface of the melting tank 12 so long as the position is in the above range. Further, the number of inlets 30 of the flue 28 may be plural. For example, the construction may be such that one inlet is provided on a back surface of the melting tank 12 and two inlets are provided on side wall surfaces, or a plurality of inlets may be provided only on side wall surfaces of the melting tank 12.

Figure 2:
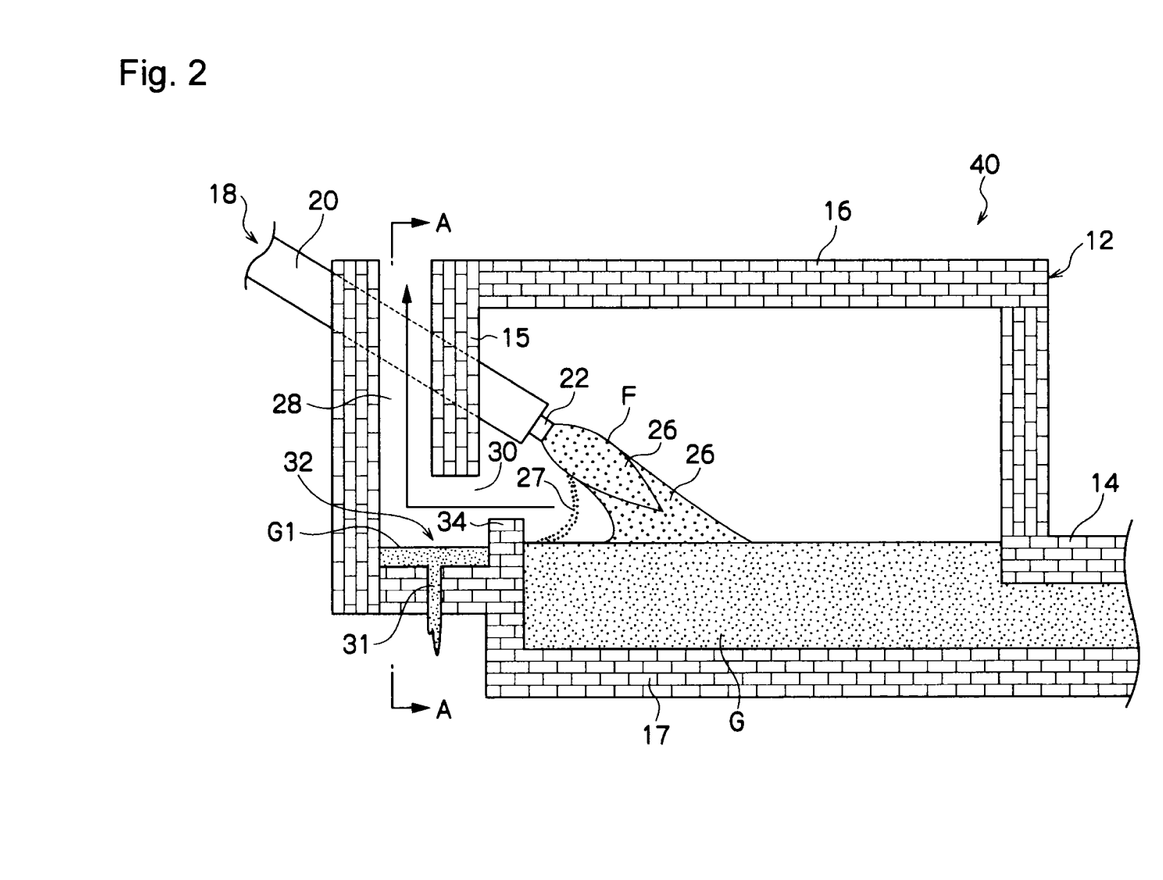
FIG. 2 is a vertical cross-sectional view of a glass-melting furnace of a second embodiment.

FIG. 2 is a vertical cross-sectional view of a glass-melting furnace 40 according to a second embodiment, and the same or similar members as those of the glass-melting furnace 10 shown in FIG. 1 are indicated by the same symbols for explanation.

In a melting tank 12 of a glass-melting furnace 40 of FIG. 2, an oxygen combustion burner 20 of a glass raw material particle heating unit 18 is disposed in an oblique downward direction toward the flow direction of a molten glass liquid G.

Figure 3:
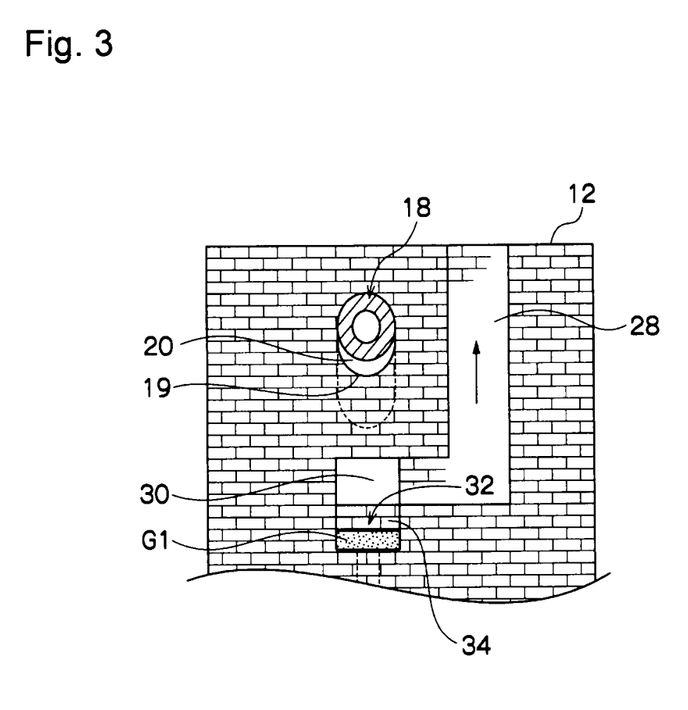
FIG. 3 is a cross-sectional view along a line A-A of the melting furnace shown in FIG. 2.

FIG. 3 is a cross-sectional view along a line A-A of the melting tank 12 shown in FIG. 2.

As shown in the figure, a flue 28 is constructed to have a crank shape so as to keep out of the way the insertion hole 19 of the oxygen combustion burner 20 penetrating the wall of the melting tank 12. The oxygen combustion burner 20 and the outlet 30 of the flue 28 are preferably disposed in substantially the central portion of the melting tank 12 in the width direction from the viewpoints of increasing the homogeneity of the molten glass liquid G and smoothly exhausting floating particles. However, in such a case, if the flue 28 is constructed to have a straight tube shape, the oxygen combustion burner 20 penetrates through the flue 28, such being not preferred. Accordingly, in order to overcome such a problem, the flue 28 is constructed to have a crank shape as shown in FIG. 3.

Thus, when the oxygen combustion burner 20 is obliquely disposed, an exhaust gas (including a gas for conveying glass raw material particles) from the oxygen combustion burner 20 is blown in an oblique downward forward direction. Thereafter, the exhaust gas flows toward an upstream side wall face 15 in which the flue is disposed. Accordingly, particles 27, 27 . . . dissipated from the halfway of the flame F tend to contact with the surface of the molten glass liquid G as compared with a case of disposing the oxygen combustion burner 20 in the vertical direction or the horizontal direction as shown in FIG. 1, whereby the particles are easily captured by the molten glass liquid G. Accordingly, the amount of floating particles in the exhaust gas decreases, and it is possible to efficiently vitrify the glass raw material particles.

Figure 4:
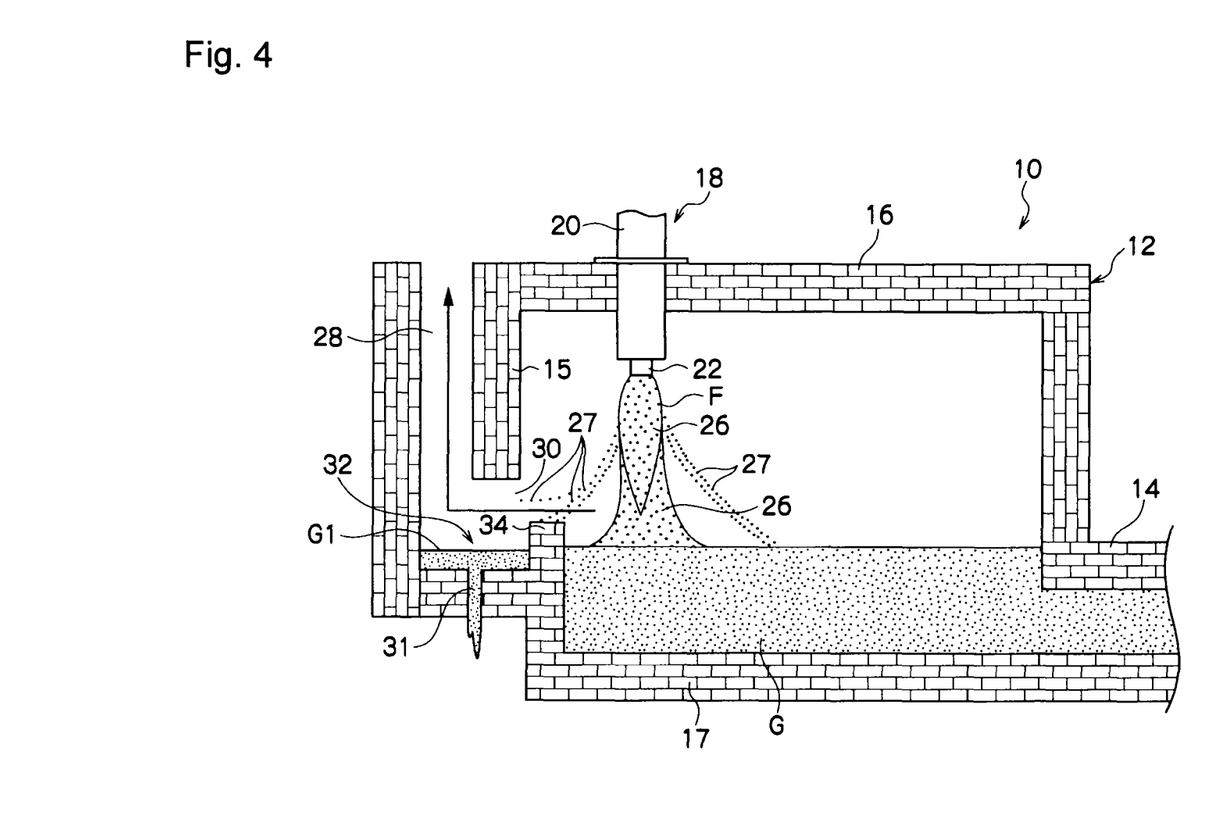
FIG. 4 is an explanation view illustrating the flow of glass fine particles in the glass-melting furnace shown in FIG. 1.

FIG. 4 schematically shows flying state of particles deviated from a halfway of the flame F produced by the oxygen combustion burner 20 shown in FIG. 1. Thus, when the oxygen combustion burner is disposed vertically, particles 27, 27 . . . contained in the periphery of the exhaust gas and deviated from a halfway of the flame F, are blown by the exhaust gas and sucked toward the flue 28, whereby it becomes difficult for the particles to contact with the molten glass liquid G and they scatter in the furnace in some cases. On the other hand, when the oxygen combustion burner 20 is disposed in an oblique downward direction as shown in FIG. 2, particles 27, 27 . . . contained in the peripheral portion of the exhaust gas easily contact with the molten glass liquid G, and they are easily captured by the molten glass liquid G, whereby dispersion of the particles 27, 27 . . . in the furnace is prevented to suppress generation of floating particles and the glass raw material particles are efficiently vitrified.

The oblique angle of the oxygen combustion burner 20 is preferably set to be 15° to 75° to the vertical direction in order to efficiently bring the particles 27, 27 . . . in the exhaust gas into contact with the molten glass liquid G, and the angle is more preferably from 30° to 60°. Here, the above embodiment that the angle of the oxygen combustion burner is inclined to the flow direction of molten glass liquid, is a preferred embodiment, and an embodiment that the oxygen combustion burner is disposed in the vertical direction or inclined to a reverse direction of the flow direction of the molten glass liquid, is also within the scope of the present invention, which provides an effect of suppressing damage of a furnace wall due to the exhaust gas and deterioration of the quality of the molten glass.

Figure 5:
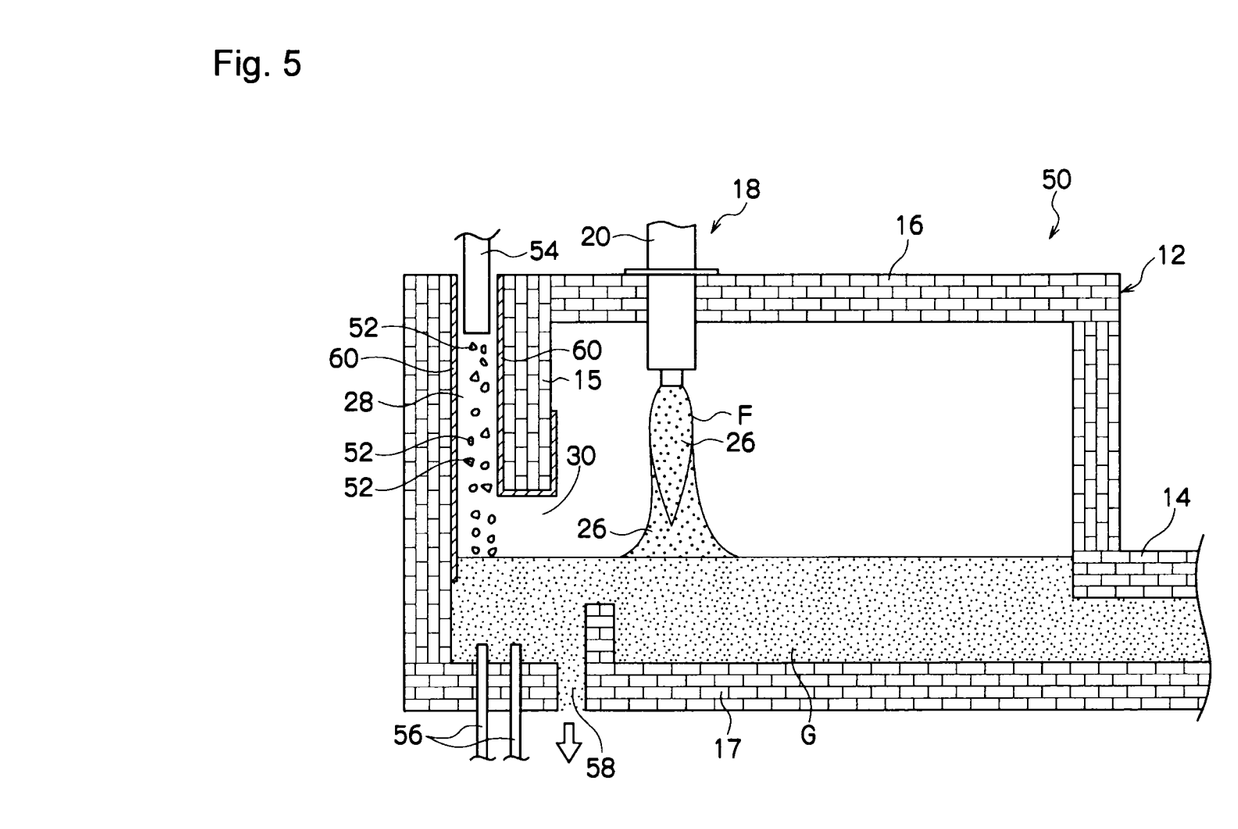
FIG. 5 is a vertical cross-sectional view of a glass-melting furnace of a third embodiment.

FIG. 5 is a vertical cross-sectional view of a glass-melting furnace 50 according to a third embodiment, and members the same or similar to those of the glass-melting furnace 10 shown in FIG. 1 are indicated by the same symbols for explanation.

In the upper portion of a flue 28 of the glass-melting furnace 50, a glass cullet piece feed tube 54 (glass cullet piece feed portion) for feeding glass cullet pieces 52, 52 . . . , is provided.

When glass cullet pieces 52, 52 . . . are fed downwardly from the glass cullet piece feed tube 54, a surface of the glass cullet pieces 52, 52 . . . is heated by a high-temperature exhaust gas flowing through the flue, and the pieces fall onto the molten glass liquid G under the flue 28. Here, a wall face of the flue 28 of the melting tank 12 is coated with e.g. platinum 60, in order to protect refractories of the flue 28 against floating particles in the exhaust gas. Further, the melting tank 12 is not provided with a dam (dam 34 shown in FIGS. 1, 2 and 4), and accordingly, a molten glass liquid G present right under the flue 28 is also handled as a product molten glass liquid G.

Accordingly, in this melting tank 12, glass cullet pieces 52, 52 . . . are preliminarily heated by the exhaust gas before falling into the molten glass liquid G present below, it is possible to efficiently melt the glass cullet pieces 52 as compared with an embodiment wherein the glass cullet pieces 52, 52 . . . are directly fed into the molten glass liquid G. Further, since floating particles in the exhaust gas suctioned into the flue 28, fall into the molten glass liquid G below in a state that they adhere to surfaces of the fed glass cullet pieces 52, 52 . . . , it is possible to efficiently use the floating particles in the exhaust gas.

Here, in order to facilitate melt of the glass cullet pieces 52, 52 . . . fed into the molten glass liquid G, a heater 56 (heating means for heating molten glass liquid) for heating the molten glass liquid G at the falling position is provided. Further, in a furnace bottom portion 17 of the falling position, a drain-out tube 58 is provided so as to penetrate through the furnace bottom portion 17, whereby it is possible to discharge a condensed heterogeneous molten glass sedimented on the furnace bottom portion 17 at the falling position, through the drain-out tube 58.

The particle size of the glass cullet pieces 52 fed from the glass cullet piece feed tube 54 into the melting tank 12 is specified considering flying of glass cullet pieces themselves, handling efficiency of the glass cullet pieces in recovering them from the production line or the market, storing and conveying them to the glass cullet piece feed port. Namely, the minor diameter (a) of the glass cullet pieces is preferably 0.1 mm<a<50 mm. Selection of the glass cullet pieces having the minor diameter (a) is carried out by screening the glass cullet pieces through a sieve while changing the size of the mesh opening. Namely, the glass cullet pieces of the present invention are preferably ones remaining on a sieve having a mesh opening of 0.1 mm and passing through a sieve having a mesh opening of 50 mm. The minor diameter (a) is preferably 0.5 mm<a<30 mm from the viewpoint of the handling of the glass cullet pieces. The minor diameter (a) is more preferably 5 mm<a<20 mm from the viewpoint of the handling of the glass cullet pieces. However, even if the minor diameter (a) exceeds 50 mm, the effect of capturing glass fine particles by making them adhere to the surfaces of falling glass cullet pieces 52, does not change.

In the present invention, "glass cullet" means a glass cullet having substantially the same glass composition as that of glass products being the final products of the present invention. This glass cullet is usually produced in a step of producing glass products being the final products from a molten glass liquid formed in a furnace bottom portion. However, the cullet is not limited thereto, and it may be e.g. a glass cullet produced in a production step of other glass products having substantially the same glass composition as that of the glass products being the final products of the present invention, or a glass cullet produced in a step of using glass products being the final products obtained by the present invention. The glass-melting furnace in the production step of other glass products, is not limited to a glass-melting furnace using in-flight glass melting method.

When the glass composition of a glass cullet is substantially the same as the glass composition of a glass produced from glass raw material particles, the glass composition of a molten glass, that is a mixture of liquid glass formed from melted glass cullet pieces and liquid glass formed from glass raw material particles, becomes uniform, thermal energy required for homogenization becomes small and a time required for homogenization is short. The glass composition of glass cullet and the glass composition of liquid glass particles formed from glass raw material particles are preferably the same. However, since the glass composition may slightly change (for example, e.g. evaporation of volatile glass components such as boron oxide) in the process that the molten glass liquid formed in the melting furnace bottom portion becomes glass products, such a slight difference of glass composition is acceptable.

Here, since a glass cullet is made of a material already forming a glass, heated glass cullet pieces are simply melted into liquid glass particles. On the other hand, glass raw material particles undergo chemical reactions such as a thermal decomposition of glass raw material (for example, thermal decomposition from metal carbonate to metal oxide) and a so-called vitrification consisting of a reaction and melt of a composition to be a glass, to be liquid glass particles. Although the glass raw material particles are different from glass cullet pieces in the mechanism of changing solid particles into liquid glass particles, they are substantially the same in the glass composition of the produced liquid glass particles.

Figure 6:
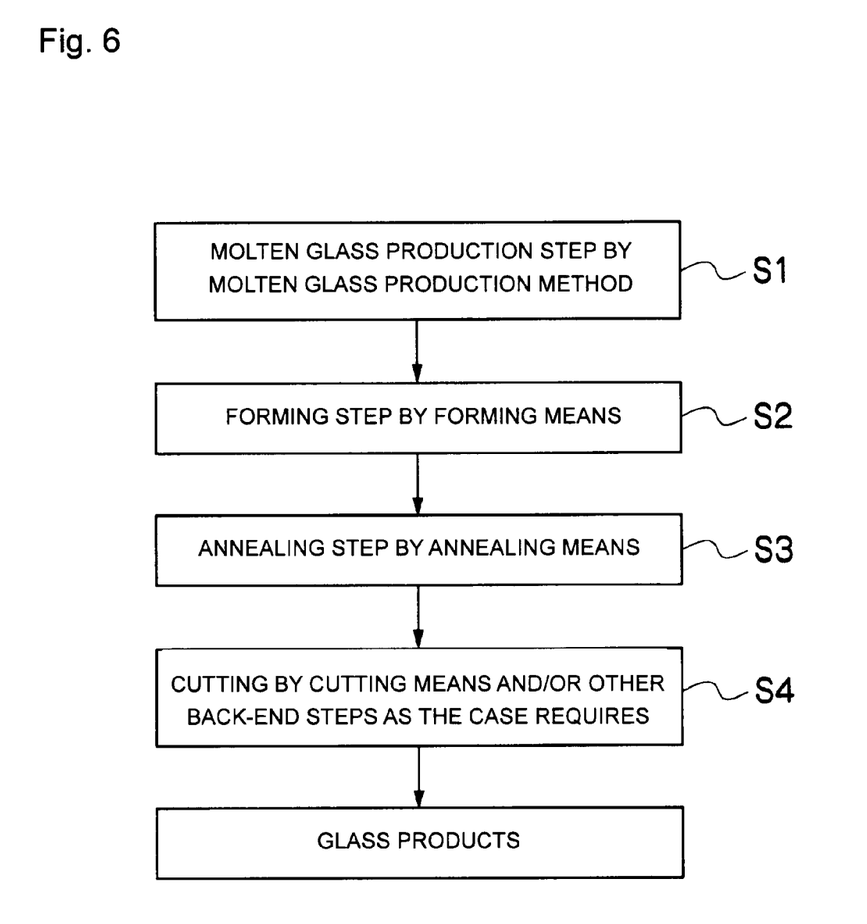
FIG. 6 is a flow chart showing a process for producing glass products of this embodiment.

FIG. 6 is a flowchart showing the process for producing glass products of this embodiment. FIG. 6 shows constituent features of the process for producing glass products, that are a molten glass-producing step (S1), a forming step (S2) by a forming means, an annealing step (S3) by an annealing means, and a cutting step and other back-end steps (S4) to be carried out as the case requires.

A molten glass liquid G melted in the melting tank 12 shown in FIGS. 1 to 5 is conveyed through an outlet and a conduit structure, not shown, to a forming means and is formed (forming step). The formed glass is annealed by an annealing means (annealing step) to prevent residual stress from remaining inside a solidified glass after formation. Further, the glass is cut (cutting step) and subjected to other back-end steps as the case requires, to be glass products. Here, the forming step (S2), the annealing step (S3) and the cutting step and other back-end steps (S4) may be any steps so long as they achieve their objects. For example, in a case of plate glass, the molten glass liquid G is formed into a glass ribbon by a forming means, it is annealed by an annealing means and cut into a desired size, and is subjected to a back-end step such as a grinding step of glass ends to obtain a plate glass.

The molten glass G produced by the process for producing molten glass of the present invention, is not limited in the composition so long as the molten glass is one produced by in-flight heating melting method. Accordingly, it may be soda lime glass or borosilicate glass. Further, the application of the glass products to be produced is not limited to architecture and vehicle applications, and it may be flat panel display application or other various types of applications.

In a case of soda lime glass to be used for a plate glass for architecture or vehicle application, the glass preferably has a composition that $SiO_2$: 65 to 75%, $Al_2O_3$: 0 to 3%, CaO: 5 to 15%, MgO: 0 to 15%, $Na_2O$: 10 to 20%, $K_2O$: 0 to 3%, $Li_2O$: 0 to 5%, $Fe_2O_3$: 0 to 3%, $TiO_2$: 0 to 5%, $CeO_2$: 0 to 3%, BaO: 0 to 5%, SrO: 0 to 5%, $B_2O_3$: 0 to 5%, ZnO: 0 to 5%, $ZrO_2$: 0 to 5%, $SnO_2$: 0 to 3%, and $SO_3$: 0 to 0.5% in terms of mass percentage of oxide.

In a case of alkali-free glass to be employed for a substrate of liquid crystal display or organic EL display, the glass preferably has a composition that $SiO_2$: 39 to 70%, $Al_2O_3$: 3 to 25%, $B_2O_3$: 1 to 20%, MgO: 0 to 10%, CaO: 0 to 17%, SrO: 0 to 20% and BaO: 0 to 30% in terms of mass percentage of oxide.

In a case of mixed alkali glass to be employed for a substrate for plasma display, the glass preferably has a composition that $SiO_2$: 50 to 75%, $Al_2O_3$: 0 to 15%, MgO+CaO+SrO+BaO+ZnO: 6 to 24% and $Na_2O+K_2O$: 6 to 24% in terms of mass percentage of oxide.

As another application, in a case of a borosilicate glass to be used for e.g. a heat-resistant container or laboratory equipment, the glass preferably has a composition that $SiO_2$: 60 to 85%, $Al_2O_3$: 0 to 5%, $B_2O_3$: 5 to 20% and $Na_2O+K_2O$: 2 to 10% in terms of mass percentage of oxide.

INDUSTRIAL APPLICABILITY

Molten glass produced by the present invention is formed into various types of glass products by a forming means such as a float bath, a fusion forming machine, a roll out forming machine, a blow forming machine or a press molding machine.

This application is a continuation of PCT Application No. PCT/JP2010/063724, filed on Aug. 12, 2010, which is based upon and claims the benefit of priority from Japanese Patent Application No. 2009-191204 filed on Aug. 20, 2009. The contents of those applications are incorporated herein by reference in its entirety.

REFERENCE SYMBOLS

10: glass-melting furnace, 12: melting tank, 14: outlet, 15: upstream side wall face, 16: ceiling wall, 17: furnace bottom portion, 18: glass raw material particle heating unit (glass raw material particle feed portion and heating means for forming gas phase portion), 19: insertion hole, 20: oxygen combustion burner, 22: nozzle, F: flame, 26: liquid glass particles, 27: particles deviated from flame, 28: flue, 30: inlet, 31: discharge hole, 32: drain-out portion, 34: dam, 40: glass-melting furnace, 50: glass-melting furnace, 52: glass cullet pieces, 54: glass cullet piece feed tube, 56: heater, 58: drain-out tube, 60: platinum

What is claimed is:
1. A glass-melting furnace for changing glass raw material particles into liquid glass particles in a gas phase atmosphere in the glass-melting furnace, accumulating the liquid glass particles in a bottom portion of the glass-melting furnace to obtain a molten glass liquid and discharging the molten glass liquid, the glass-melting furnace comprising:
a glass raw material particle feed portion disposed downwardly at a furnace wall portion in an upper portion of the glass-melting furnace;
a heating device provided under the glass-raw material feed portion in the glass-melting furnace for forming a gas phase portion for changing glass raw material particles into liquid glass particles;
an inlet of a flue disposed on an upstream side of the gas phase portion, relative to a flow direction of the molten glass liquid, wherein the inlet of the flue is disposed such that an upper edge portion of the inlet is located at a position below a half of the distance between the molten glass liquid surface and a ceiling inner wall surface of the glass-melting furnace;
a furnace-bottom portion for accumulating the liquid glass particles to produce an accumulated molten glass liquid;
a discharge portion for discharging the accumulated molten glass liquid; and
a drain-out portion formed under the flue, said drain-out portion comprising a drain-out bottom, a drain-out discharge, and a dam for separating a drain-out molten glass liquid in the drain-out bottom from the accumulated molten glass liquid in the furnace-bottom portion, wherein the drain-out bottom and the flue are situated such that a reacted product that falls from the flue is captured in the drain-out bottom and thereby separated from the accumulated molten glass liquid in the furnace-bottom portion.

2. The glass-melting furnace according to claim 1, wherein the inlet of the flue is disposed so that the upper edge portion of the inlet is located at a position ¼ to ⅓ of the distance between the molten glass liquid surface and the ceiling inner wall surface of the glass-melting furnace, above the molten glass surface.

3. The glass-melting furnace according to claim 1, wherein the heating device is disposed so as to form the gas phase portion in an oblique downward direction toward the flow direction of the molten glass liquid.

4. The glass-melting furnace according to claim 1, wherein the flue is disposed vertically, and a glass cullet piece feed portion for feeding glass cullet pieces is provided in an upper portion of the flue.

5. The glass-melting furnace according to claim 4, further comprising a second heating device for heating a molten glass liquid under the glass cullet piece feed portion.

6. The glass-melting furnace according to claim 1, wherein the heating device for forming the gas phase portion is at least one of an oxygen combustion burner for producing oxygen combustion flame, and a multi-phase arc plasma generation apparatus constituted by at least one pair of electrodes for producing thermal plasma.

7. An apparatus for producing glass products, the apparatus comprising:
    the glass-melting furnace of claim 1;
    a forming unit for forming a molten glass provided on a downstream side of the glass-melting furnace; and
    an annealing unit for annealing formed glass.

8. A process for producing molten glass, the process comprising:
    changing glass raw material particles into liquid glass particles in a gas phase atmosphere within a glass-melting furnace;
    accumulating the liquid glass particles in the furnace-bottom portion to obtain an accumulated molten glass liquid at the furnace-bottom portion;
    separating a drain-out molten glass liquid in the drain-out portion; and
    discharging the accumulated molten glass liquid,
    wherein the glass-melting furnace comprises:
    a glass raw material particle feed portion disposed downwardly at a furnace wall portion in an upper portion of the glass-melting furnace;
    a heating device provided under the glass-raw material feed portion in the glass-melting furnace for forming a gas phase portion for changing glass raw material particles into liquid glass particles;
    an inlet of a flue disposed on an upstream side of the gas phase portion, relative to a flow direction of the molten glass liquid, wherein the inlet of the flue is disposed such that an upper edge portion of the inlet is located at a position below a half of the distance between the molten glass liquid surface and a ceiling inner wall surface of the glass-melting furnace;
    a furnace-bottom portion for accumulating the liquid glass particles to produce an accumulated molten glass2 liquid;
    a discharge portion for discharging the accumulated molten glass liquid; and
    a drain-out portion formed under the flue, said drain-out portion comprising a drain-out bottom, a drain-out discharge, and a dam for separating a drain-out molten glass liquid in the drain-out bottom the accumulated molten glass liquid in the furnace-bottom portion, and
    wherein the drain-out bottom and the flue are situated such that a reacted product that falls from the flue is captured in the drain-out bottom and thereby separated from the accumulated molten glass liquid in the furnace-bottom portion.

9. A process for producing glass products, the process comprising:
    producing a molten glass by the process of claim 8;
    forming the molten glass; and
    annealing the formed glass.

10. A process for producing molten glass, which is a process of changing glass raw material particles into liquid glass particles in a gas phase atmosphere in a glass-melting furnace, accumulating the liquid glass particles in a bottom portion of the glass-melting furnace to obtain a molten glass liquid, the process comprising:
    supplying glass raw material particles downwardly from a furnace wall portion in an upper portion of the glass-melting furnace, such that making the glass raw material particles pass through a gas phase portion formed by a heating device which changes the glass raw material particles into liquid glass particles;
    sucking an exhaust gas produced by the heating device means from an inlet of a flue disposed on an upstream side of the gas phase portion, relating to the flow direction of the molten glass liquid~ and at a height within a range below a half of the height of a space above the molten glass liquid surface; and
    accumulating the liquid glass particles in a bottom portion of the glass-melting furnace to obtain a molten glass liquid,
    wherein the glass-melting furnace comprises:
    a glass raw material particle feed portion disposed downwardly at a furnace wall portion in an upper portion of the glass-melting furnace;
    a heating device provided under the glass-raw material feed portion in the glass-melting furnace for forming a gas phase portion for changing glass raw material particles into liquid glass particles;
    an inlet of a flue disposed on an upstream side of the gas phase portion, relative to a flow direction of the molten glass liquid, wherein the inlet of the flue is disposed such that an upper edge portion of the inlet is located at a position below a half of the distance between the molten glass liquid surface and a ceiling inner wall surface of the glass-melting furnace;
    a furnace-bottom portion for accumulating the liquid glass particles to produce an accumulated molten glass liquid;
    a discharge portion for discharging the accumulated molten glass liquid; and
    a drain-out portion formed under the flue, said drain-out portion comprising a drain-out bottom, a drain-out discharge, and a dam for separating a drain-out molten glass liquid in the drain-out bottom the accumulated molten glass liquid in the furnace-bottom portion, and
    wherein the drain-out bottom and the flue are situated such that a reacted product that falls from the flue is captured in the drain-out bottom and thereby separated from the accumulated molten glass liquid in the furnace-bottom portion.

11. The process according to claim 10, further comprising capturing floating particles, that are derived from glass raw material particles contained in an exhaust gas suctioned from the inlet of the flue and passing through the flue and that do not reach the molten glass surface in the furnace bottom portion, by the drain-out molten glass liquid right under the flue.

12. The process according to claim 10, wherein the inlet of the flue is disposed so that the upper edge portion of the inlet is located at a position $\frac{1}{4}$ to $\frac{1}{3}$ of the distance between the molten glass liquid surface and the ceiling inner wall surface of the glass-melting furnace, above the molten glass liquid surface.

* * * * *